(12) United States Patent
Cheng

(10) Patent No.: US 7,920,830 B2
(45) Date of Patent: Apr. 5, 2011

(54) METHOD FOR PERFORMING A RADIO FREQUENCY TEST ON A MOBILE PHONE

(75) Inventor: Hsueh-Lien Cheng, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 541 days.

(21) Appl. No.: 12/106,336

(22) Filed: Apr. 21, 2008

(65) Prior Publication Data
US 2009/0098868 A1    Apr. 16, 2009

(30) Foreign Application Priority Data
Oct. 12, 2007 (CN) .......................... 2007 1 0202050

(51) Int. Cl.
*H04B 17/00* (2006.01)
(52) U.S. Cl. ................ 455/67.14; 455/115.1; 455/226.1
(58) Field of Classification Search ................ 455/67.14
See application file for complete search history.

(56) References Cited

U.S. PATENT DOCUMENTS

| | | | |
|---|---|---|---|
| 5,311,122 A | | 5/1994 | Fullerton et al. |
| 6,122,505 A | * | 9/2000 | Genell et al. ................. 455/423 |
| 6,978,131 B1 | * | 12/2005 | Lee ................................ 455/423 |
| 7,240,252 B1 | * | 7/2007 | Fessler et al. ................. 714/712 |

* cited by examiner

*Primary Examiner* — Matthew D. Anderson
*Assistant Examiner* — David Bilodeau
(74) *Attorney, Agent, or Firm* — Frank R. Niranjan

(57) ABSTRACT

A method for performing an radio frequency test of a mobile phone (5) includes: setting standard parameters of a transmitter (52); controlling an RF tester (3) to send RF signals to a receiver (53); processing the RF signals and transmitting the processed RF signals to the transmitter, reprocessing the processed RF signals and transmitting the reprocessed signals to the RF tester; obtaining resulting parameters of the RF performance of the transmitter; determining whether the RF performance of the transmitter is acceptable; setting standard parameters of the receiver; controlling the RF tester to send RF signals to a combiner (4), and controlling a disturbance source (2) to send channel noise to the combiner; generating combined signals by combining the RF signals and the channel noise, and transmitting to the receiver; obtaining resulting parameters of the RF performance of the receiver; and determining whether the RF performance of the receiver is acceptable.

10 Claims, 3 Drawing Sheets

METHOD FOR PERFORMING A RADIO FREQUENCY TEST ON A MOBILE PHONE

BACKGROUND OF THE INVENTION

1. Field of the Invention

The present invention generally relates to methods for performing a radio frequency test on a mobile phone.

2. Description of Related Art

Sound waves are generally between 20 Hz to 20 KHz and are difficult to transmit over long distances through air. Electromagnetic waves (EM) lower than 100 KHz are absorbed by the ground surface and may not be effectively transmitted over long distances. However, EM waves having a frequency higher than 100 KHz, may be transmitted over long distances though the air. EM waves having a frequency higher than 100 KHz are called radio frequencies (RF). For transmitting sound waves (human voice) over a mobile phone, the sound waves are modulated to RF waves by the mobile phone before being transmitted through the air.

The principle of wireless communication between mobile phones is: modulating electronic information sources (i.e., analog signals and digital signals) with high-frequency current to generate RF signals by one mobile phone, transmitting the RF signals in the air via an antenna of the mobile phone, receiving the RF signals and demodulating the RF signals to the electronic information sources by another mobile phone. The RF performance of a mobile phone is a key factor that affects the wireless communication between mobile phones. Therefore, it is necessary to perform an RF performance test of the mobile phone before the mobile phone is put into the market. Conventional methods for performing the RF performance test is implemented by manual work, which has some disadvantages, such as, inefficiency and time-consuming.

Accordingly, what is needed is a method for automatically and efficiently performing a radio frequency test on a mobile phone, which tests the performance of the radio frequency automatically and efficiently.

SUMMARY

One exemplary embodiment provides a method for performing a radio frequency (RF) performance test on a mobile phone. The mobile phone includes a transmitter and a receiver. The method includes: providing a computer and an RF tester, and connecting RF tester with the computer and the mobile phone; setting standard parameters of the transmitter in the computer; controlling the RF tester to send RF signals to the receiver of the mobile phone; processing the RF signals and transmitting the processed RF signals to the transmitter from the receiver, and reprocessing the processed RF signals and transmitting the reprocessed RF signals to the RF tester from the transmitter; obtaining resulting parameters of the RF performance of the transmitter via the RF tester; determining whether the RF performance of the transmitter is acceptable by comparing the resulting parameters of the RF performance of the transmitter with the standard parameters of the transmitter; providing a disturbance source and a combiner, connecting the computer, the disturbance source, the combiner, and the mobile phone respectively in that order, disconnecting the RF tester with the mobile phone and connecting the RF tester with the combiner, if the RF performance of the transmitter is acceptable; setting standard parameters of the receiver; controlling the RF tester to send RF signals to the combiner, and controlling the disturbance source to send channel noise to the combiner; generating combined signals by combining the RF signals sent from the RF tester and the channel noise sent from the disturbance source, and transmitting the combined signals to the receiver; obtaining resulting parameters of the RF performance of the receiver via the RF tester; and determining whether the RF performance of the receiver is acceptable by comparing the resulting parameters of the RF performance of the receiver with the standard parameters of the receiver, thereby determining whether the RF performance of the mobile phone is acceptable.

Other systems, methods, features, and advantages will be or become apparent to one skilled in the art upon examination of the following drawings and detailed description.

DETAILED DESCRIPTION OF THE EMBODIMENTS

Figure 1:
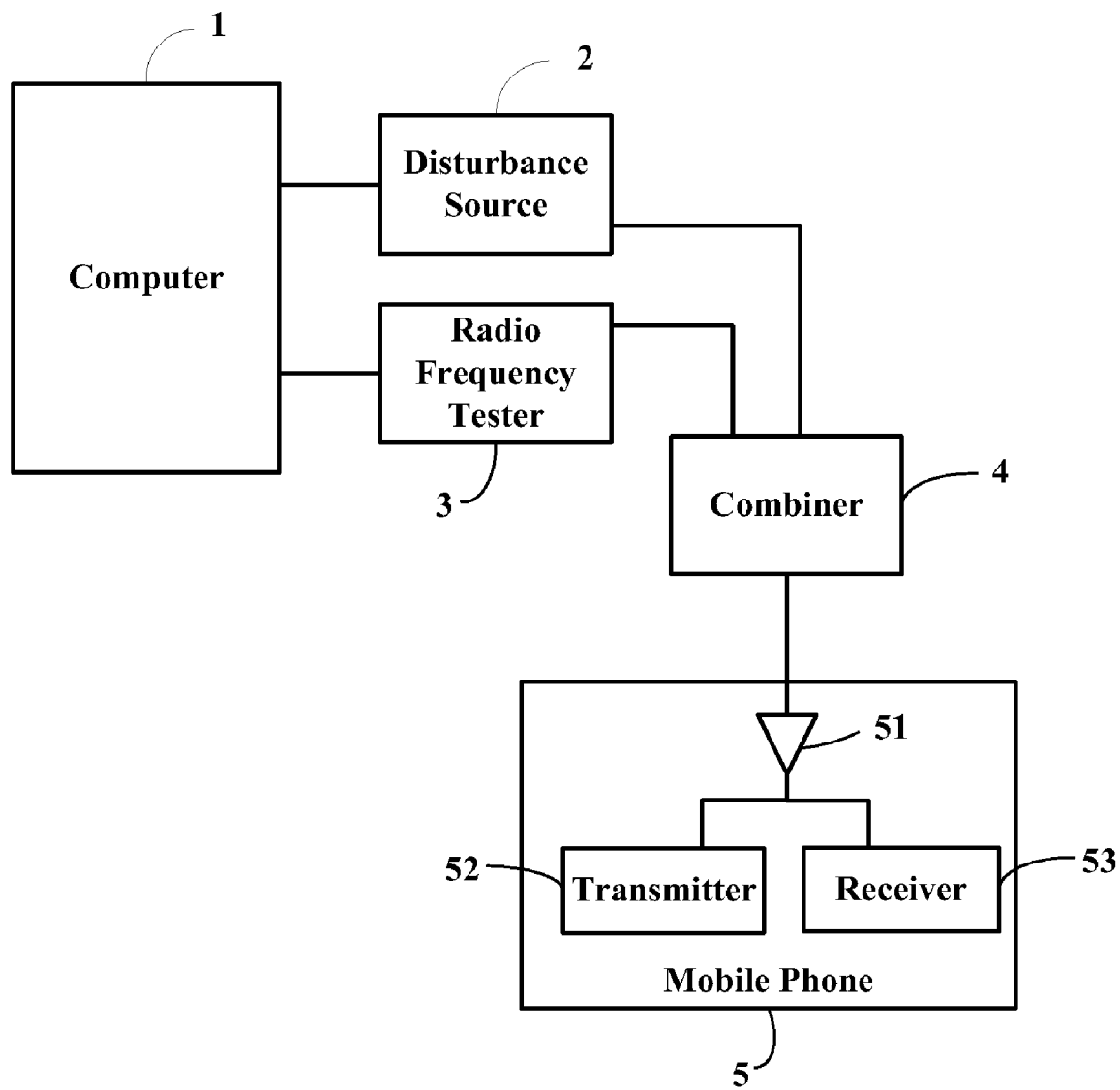
FIG. 1 is a block diagram of system architecture for performing a radio frequency performance test on a receiver of a mobile phone in accordance with an exemplary embodiment of the present invention.

FIG. 1 is a block diagram of system architecture for performing a radio frequency (RF) performance test on a receiver of a mobile phone in accordance with an exemplary embodiment of the present invention. The system architecture typically includes a computer 1, a disturbance source 2, an RF tester 3, a combiner 4, and a mobile phone 5. The disturbance source 2 and the RF tester 3 are both connected to the computer 1 via general-purpose interface buses, and connected to the combiner 4 via RF cable lines. The mobile phone 5 includes an antenna 51, a transmitter 52, and a receiver 53. The transmitter 52 and the receiver 53 are connected to the antenna 51. The combiner 4 is connected to the antenna 51 via an RF cable line.

The disturbance source 2 is configured for simulating channel noise of the mobile phone 5, and sending the channel noise to the combiner 4.

The RF tester 3 is configured for testing resulting parameters of an RF performance of the transmitter 52 and an RF performance of the receiver 53. The resulting parameters of the RF performance of the transmitter 52 include a transmission power, a transmission local oscillation, a transmission intermediate frequency, a transmission frequency, and a phase. The resulting parameters of the RF performance of the receiver 53 include a receiving sensitivity, an error rate, a receiving local oscillation, and a single tone desensitization.

The combiner 4 is configured for generating combined signals by combining RF signals sent from the RF tester 3 and the channel noise simulated by the disturbance source 2, and also for transmitting the combined signals to the receiver 53.

The mobile phone 5 is a bidirectional RF communication mobile phone that is configured for sending and receiving audio data by utilizing the antenna 51, the transmitter 52, and the receiver 53. For example, the receiver 53 is configured for receiving analog signals from outside communication network via the antenna 51, processing the received analog signals by amplifying the analog signals, lowering frequency, wave filtering, and converting the analog signals to digital signals. The transmitter 52 is configured for converting digital signals to analog signals, reprocessing the analog signals by increasing frequency, wave filtering, and amplifying the analog signals, and transmitting the reprocessed analog signals to the outside communication network via the antenna 51.

While performing the RF performance test on the receiver 53, the computer 1 is configured for setting standard parameters of the receiver 53, controlling the RF tester 3 to send the RF signals to the combiner 4, controlling the disturbance source 2 to send the channel noise to the combiner 4, obtaining resulting parameters of the RF performance of the receiver 53 via the RF tester 3, and determining whether the RF performance of the receiver 53 is acceptable by comparing the resulting parameters of the RF performance of the receiver 53 with the standard parameters of the receiver 53. If the resulting parameters of the RF performance of the receiver 53 correspond to the standard parameters of the receiver 53, the RF performance of the receiver 53 is determined to be acceptable; otherwise, if the resulting parameters of the RF performance of the receiver 53 do not correspond to the standard parameters of the receiver 53, the RF performance of the receiver 53 is determined to be unacceptable.

Figure 2:
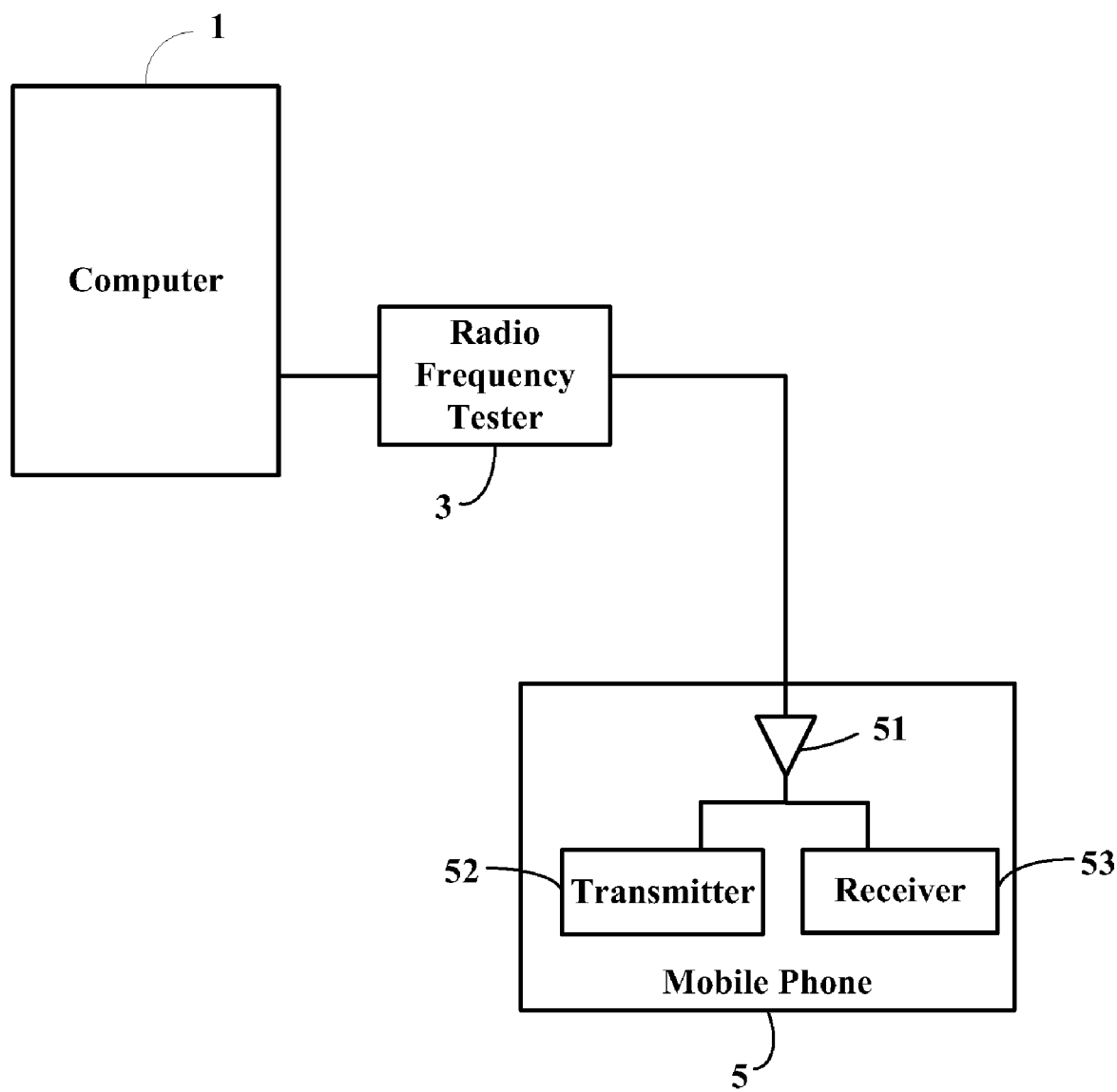
FIG. 2 is a block diagram of system architecture for performing a radio frequency performance test on a transmitter of a mobile phone in accordance with the exemplary embodiment.

FIG. 2 is a block diagram of system architecture for performing an RF performance test on a transmitter of a mobile phone in accordance with the exemplary embodiment. Compared with the system architecture for performing the RF performance test on the receiver 53 as shown in FIG. 1, the system architecture for performing the RF performance test on the transmitter 52 also includes the computer 1, the RF tester 3, and the mobile phone 5, but does not includes the disturbance source 2 and the combiner 4. The RF tester 3 is connected to the antenna 51 of the mobile phone 5 directly via the RF cable line.

While performing the RF performance test on the transmitter 52, the computer 1 is configured for setting standard parameters of the transmitter 52, controlling the RF tester 3 to send the RF signals to the receiver 52, obtaining resulting parameters of the RF performance of the transmitter 52 via the RF tester 3, and determining whether the RF performance of the transmitter 52 is acceptable by comparing the resulting parameters of the RF performance of the transmitter 52 with the standard parameters of the transmitter 52. If the resulting parameters of the RF performance of the transmitter 52 correspond to the standard parameters of the transmitter 52, the RF performance of the transmitter 52 is determined to be acceptable; otherwise, if the resulting parameters of the RF performance of the transmitter 52 do not correspond to the standard parameters of the transmitter 52, the RF performance of the transmitter 52 is determined to be unacceptable.

After completing the RF performance test of the transmitter 52 and the receiver 53, the RF tester 3 is further configured for determining whether the RF performance of the mobile phone 5 is acceptable according to the RF performances of the transmitter 52 and the receiver 53.

Figure 3:
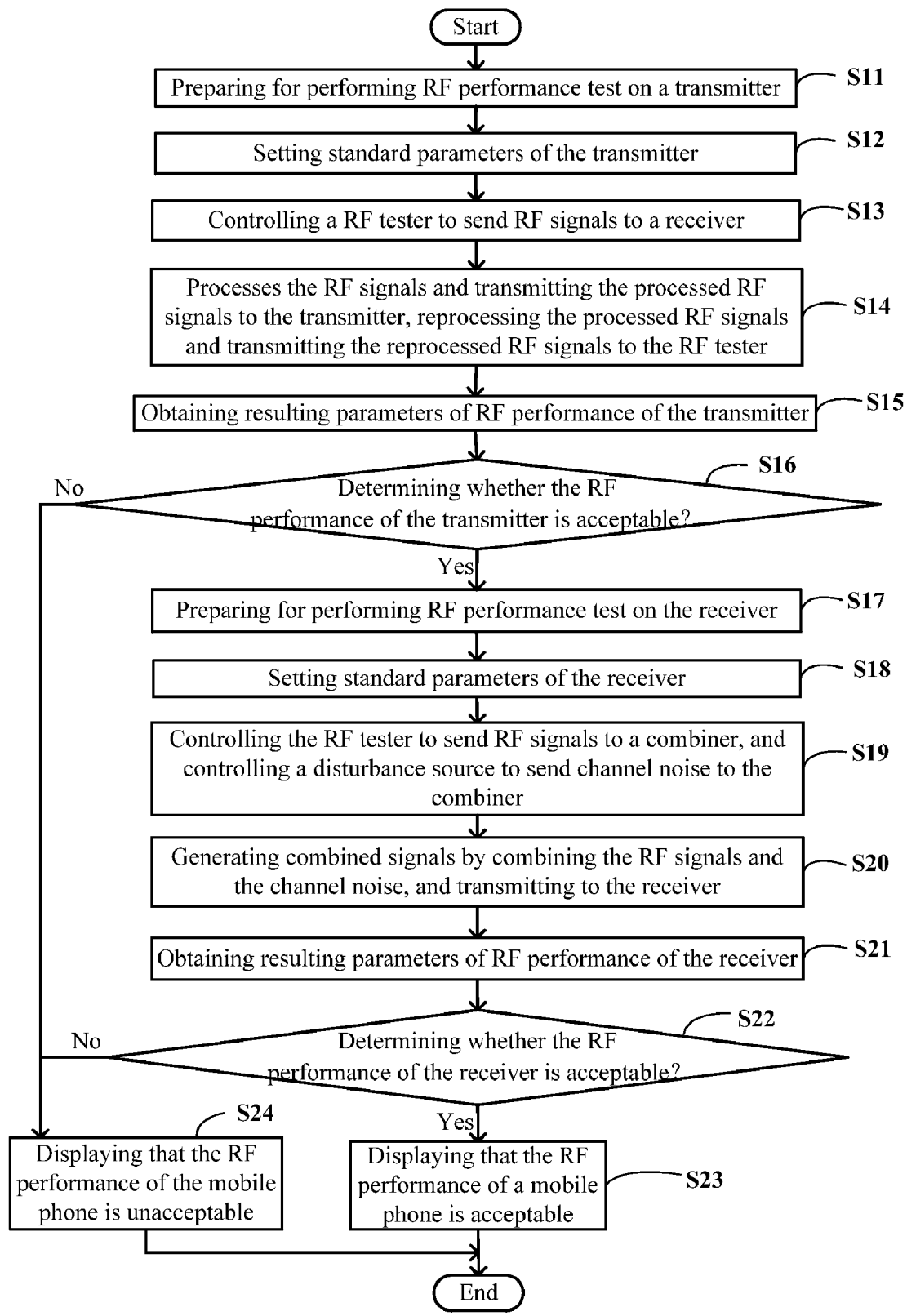
FIG. 3 is a flowchart of a method for performing a radio frequency test on a mobile phone in accordance with the exemplary embodiment.

FIG. 3 is a flowchart of a method for performing the RF performance test on the mobile phone in accordance with the exemplary embodiment.

In step S11, preparations for performing the RF performance test on the transmitter 52, which involves: connecting the computer 1, the RF tester 3 and the mobile phone 5 as shown in FIG. 2, are carried out.

In step S12, the computer 1 sets the standard parameters of the transmitter 52.

In step S13, the computer 1 controls the RF tester 3 to send RF signals to the receiver 52.

In step S14, the receiver 52 processes the RF signals and transmits the processed RF signals to the transmitter 53, and the transmitter 53 reprocesses the processed RF signals and transmits the reprocessed RF signals to the RF tester 3. For example, the receiver 52 processed the RF signals by amplifying the RF signals, lowering frequency, wave filtering, and converting a type of the RF signals from analog signals to digital signals. The transmitter 52 reprocesses the processed RF signals by converting the type of the RF signals from the digital signals to the analog signals, increasing frequency, wave filtering, and amplifying the RF signals.

In step S15, the computer 1 obtains resulting parameters of the RF performance of the transmitter 52 via the RF tester 3. The resulting parameters of the RF performance of the transmitter 52 include the transmission power, the transmission local oscillation, the transmission intermediate frequency, the transmission frequency, and the phase.

In step S16, the computer 1 determines whether the RF performance of the transmitter 52 is acceptable by comparing the resulting parameters of the RF performance of the transmitter 52 with the standard parameters of the transmitter 52. If the resulting parameters of the RF performance of the transmitter 52 correspond to the standard parameters of the transmitter 52, the RF performance of the transmitter 52 is determined to be acceptable; and if the resulting parameters of the RF performance of the transmitter 52 do not correspond to the standard parameters of the transmitter 52, the RF performance of the transmitter 52 is determined to be unacceptable.

In step S17, if the RF performance of the transmitter 52 is determined to be acceptable, the preparations for performing the RF performance test on the receiver 53 are carried out, including: connecting the computer 1, the disturbance source 2, the combiner 4, and the mobile phone 5 respectively in that order, disconnecting the RF tester 3 with the mobile phone, and connecting the RF tester 3 with the combiner 4 as shown in FIG. 1. If the RF performance of the transmitter 52 is determined to be unacceptable, the procedure goes to step S24 directly.

In step S18, the computer 1 sets the standard parameters of the receiver 53.

In step S19, the computer 1 controls the RF tester 3 to send RF signals to the combiner 4, and controls the disturbance source 2 to send the channel noise to the combiner 4.

In step S20, the combiner 4 generates combined signals by combining the RF signals sent from the RF tester 3 and the channel noise sent from the disturbance source 2 into combined signals, and transmits the combined signals to the receiver 53.

In step S21, the computer 1 obtains resulting parameters of the RF performance of the receiver 53 via the RF tester 3. The resulting parameters of the RF performance of the receiver 53 include the receiving sensitivity, the error rate, the receiving local oscillation, and the single tone desensitization.

In step S22, the computer 1 determines whether the RF performance of the receiver 53 is acceptable by comparing the resulting parameters of the RF performance of the receiver 53 with the standard parameters of the receiver 53. If the resulting parameters of the RF performance of the receiver 53 correspond to the standard parameters of the receiver 53, the RF performance of the receiver 53 is determined to be acceptable; and if the resulting parameters of the RF performance of the receiver 53 do not correspond to the standard parameters of the receiver 53, the RF performance of the receiver 53 is determined to be unacceptable.

In step S23, if the RF performance of the receiver 53 is determined to be acceptable, the computer 1 displays that the RF performance of the mobile phone 5 is acceptable.

If the RF performance of the transmitter 52 is determined to be unacceptable, in step S24, the computer displays that the RF performance of the mobile phone 5 is unacceptable.

It should be emphasized that the above-described embodiments of the exemplary embodiments are merely possible examples of implementations, merely set forth for a clear understanding of the principles of the invention. Many variations and modifications may be made to the above-described exemplary embodiment without departing substantially from the spirit and principles of the invention. All such modifications and variations are intended to be included herein within the scope of this disclosure and the above-described exemplary embodiment and protected by the following claims. For example, the exemplary embodiment can perform the RF performance test of the receiver 53 firstly. As long as the RF performance of the receiver 53 and the transmitter 53 are acceptable, the RF performance of the mobile phone 5 is acceptable.

What is claimed is:

1. A method for performing the radio frequency (RF) performance test of a mobile phone, which comprises a transmitter and a receiver, the method comprising:
    providing a computer and an RF tester, and connecting the RF tester with the computer and the mobile phone;
    setting standard parameters of the transmitter in the computer;
    controlling the RF tester to send RF signals to the receiver of the mobile phone;
    processing the RF signals and transmitting the processed RF signals to the transmitter from the receiver, and reprocessing the processed RF signals and transmitting the reprocessed RF signals to the RF tester from the transmitter;
    obtaining resulting parameters of the RF performance of the transmitter via the RF tester;
    determining whether the RF performance of the transmitter is acceptable by comparing the resulting parameters of the RF performance of the transmitter with the standard parameters of the transmitter;
    providing a disturbance source and a combiner, connecting the computer, the disturbance source, the combiner, and the mobile phone respectively in that order, disconnecting the RF tester with the mobile phone and connecting the RF tester with the combiner, if the RF performance of the transmitter is acceptable;
    setting standard parameters of the receiver;
    controlling the RF tester to send RF signals to the combiner, and controlling the disturbance source to send channel noise to the combiner;
    generating combined signals by combining the RF signals sent from the RF tester and the channel noise sent from the disturbance source, and transmitting the combined signals to the receiver;
    obtaining resulting parameters of the RF performance of the receiver via the RF tester; and
    determining whether the RF performance of the receiver is acceptable by comparing the resulting parameters of the RF performance of the receiver with the standard parameters of the receiver, thereby determining whether the RF performance of the mobile phone is acceptable.

2. The method according to claim 1, further comprising:
    determining the RF performance of the transmitter is acceptable if the resulting parameters of the RF performance of the transmitter correspond to the standard parameters of the transmitter; and
    determining the RF performance of the transmitter is unacceptable if the resulting parameters of the RF performance of the transmitter do not correspond to the standard parameters of the transmitter.

3. The method according to claim 1, further comprising:
    determining the RF performance of the receiver is acceptable if the resulting parameters of the RF performance of the receiver correspond to the standard parameters of the receiver; and
    determining the RF performance of the receiver is unacceptable if the resulting parameters of the RF performance of the receiver do not correspond to the standard parameters of the receiver.

4. The method according to claim 1, wherein the resulting parameters of the RF performance of the transmitter comprises a transmission power, a transmission local oscillation, a transmission intermediate frequency, a transmission frequency, and a phase.

5. The method according to claim 1, wherein the resulting parameters of the RF performance of the receiver comprises a receiving sensitivity, an error rate, a receiving local oscillation, and a single tone desensitization.

6. A method for performing the radio frequency (RF) performance test of a mobile phone, which comprises a transmitter and a receiver, the method comprising:
    providing a computer, a disturbance source, a combiner and an RF tester, connecting the computer, the disturbance source, the combiner, and the mobile phone respectively in that order, and connecting the RF tester with the computer and the combiner;
    setting the standard parameters of the receiver;
    controlling the RF tester to send RF signals to the combiner, and controlling the disturbance source to send channel noise to the combiner;
    generating combined signals by combining the RF signals sent from the RF tester and the channel noise sent from the disturbance source, and transmitting the combined signals to the receiver;
    obtaining resulting parameters of the RF performance of the receiver via the RF tester;
    determining whether the RF performance of the receiver is acceptable by comparing the resulting parameters of the RF performance of the receiver with the standard parameters of the receiver;
    connecting the computer, the RF tester and the mobile phone respectively in that order if the RF performance of the receiver is acceptable;
    setting the standard parameters of the transmitter in the computer;
    controlling the RF tester to send RF signals to the receiver;
    processing the RF signals and transmitting the processed RF signals to the transmitter from the receiver, and reprocessing the processed RF signals and transmitting the reprocessed RF signals to the RF tester from the transmitter;
    obtaining resulting parameters of the RF performance of the transmitter via the RF tester; and
    determining whether the RF performance of the transmitter is acceptable by comparing the resulting parameters of the RF performance of the transmitter with the standard parameters of the transmitter, thereby determining whether the RF performance of the mobile phone is acceptable.

7. The method according to claim 6, further comprising:
    determining the RF performance of the receiver is acceptable if the resulting parameters of the RF performance of the receiver correspond to the standard parameters of the receiver; and determining the RF performance of the receiver is unacceptable if the resulting parameters of the RF performance of the receiver do not correspond to the standard parameters of the receiver.

8. The method according to claim 6, further comprising:
determining the RF performance of the transmitter is acceptable if the resulting parameters of the RF performance of the transmitter correspond to the standard parameters of the transmitter; and
determining the RF performance of the transmitter is unacceptable if the resulting parameters of the RF performance of the transmitter do not correspond to the standard parameters of the transmitter.

9. The method according to claim 6, wherein the resulting parameters of the RF performance of the receiver comprises a receiving sensitivity, an error rate, a receiving local oscillation, and a single tone desensitization.

10. The method according to claim 6, wherein the resulting parameters of the RF performance of the transmitter comprises a transmission power, a transmission local oscillation, a transmission intermediate frequency, a transmission frequency, and a phase.

* * * * *